J. M. DELLINGER.
DRILLING MACHINE.
APPLICATION FILED NOV. 21, 1911.

1,136,319.

Patented Apr. 20, 1915.
2 SHEETS—SHEET 1.

WITNESSES.
Harry G. Martin
Wm. J. Mingle Jr.

INVENTOR
John M. Dellinger
BY
Wm. J. Mingle
ATTORNEY.

J. M. DELLINGER.
DRILLING MACHINE.
APPLICATION FILED NOV. 21, 1911.
1,136,319.
Patented Apr. 20, 1915.
2 SHEETS—SHEET 2.
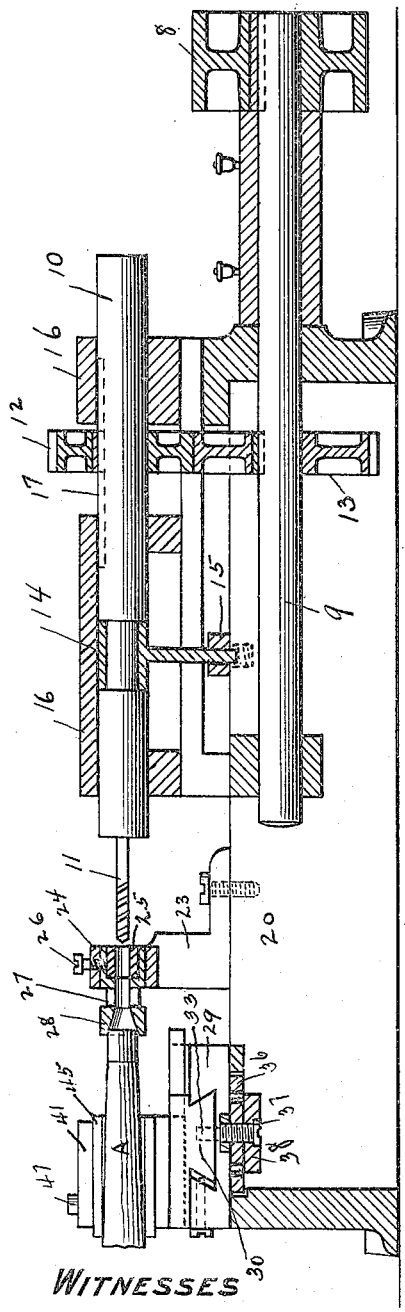
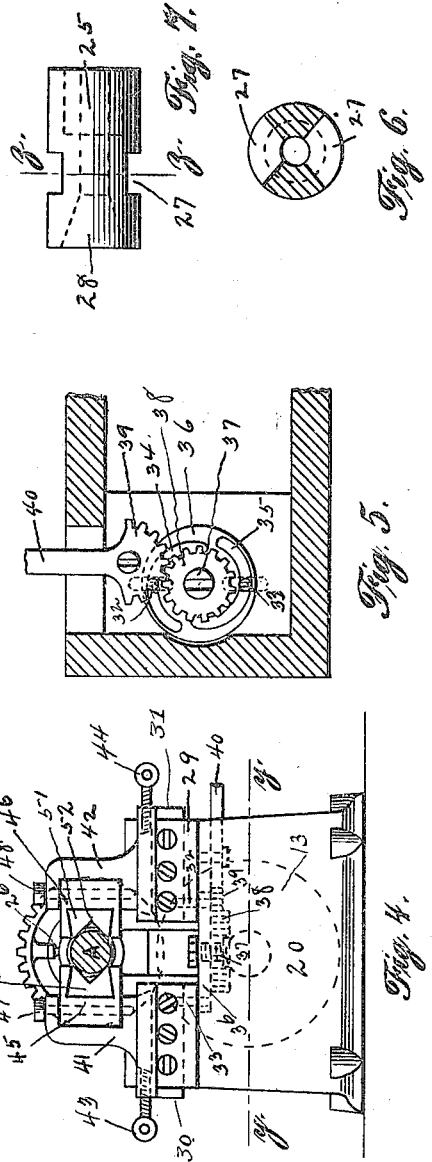
WITNESSES
Harry G. Martin
Wm. J. Mingle Jr.
INVENTOR
John M. Dellinger
BY
Wm. J. Mingle
ATTORNEY

UNITED STATES PATENT OFFICE.

JOHN M. DELLINGER, OF LANCASTER, PENNSYLVANIA, ASSIGNOR TO FOLLMER CLOGG & CO., OF LANCASTER, PENNSYLVANIA, A CORPORATION OF NEW YORK.

DRILLING-MACHINE.

1,136,319.  Specification of Letters Patent.  Patented Apr. 20, 1915.

Application filed November 21, 1911. Serial No. 661,456.

*To all whom it may concern:*

Be it known that I, JOHN M. DELLINGER, a citizen of the United States, residing at Lancaster, in the county of Lancaster and State of Pennsylvania, have invented certain new and useful Improvements in Drilling-Machines, of which the following is a specification.

My invention is illustrated in the accompanying drawings forming part of the specification and wherein:—

Figure 1:
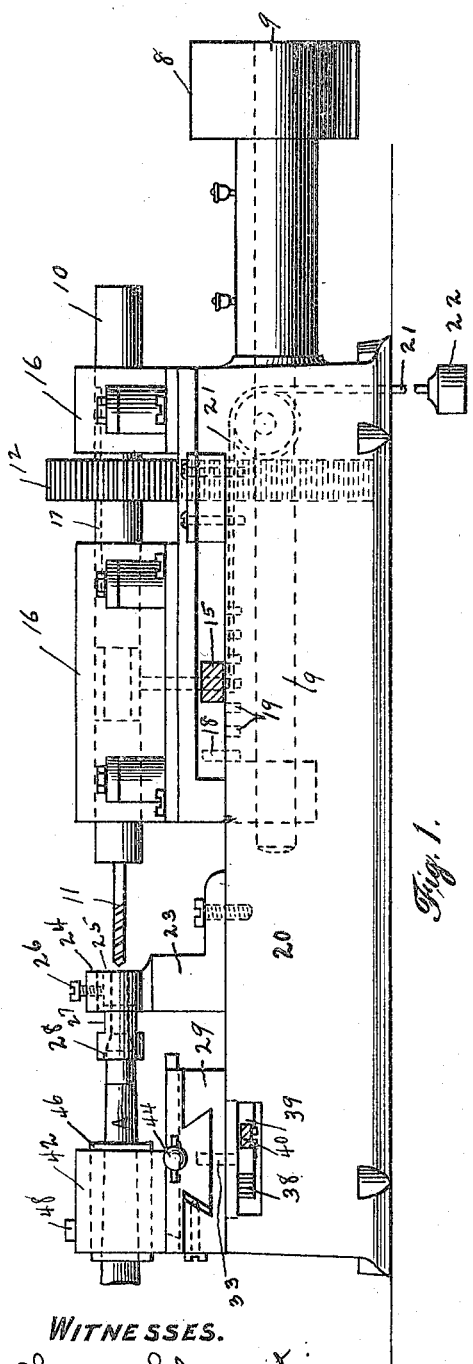
Figure 2:
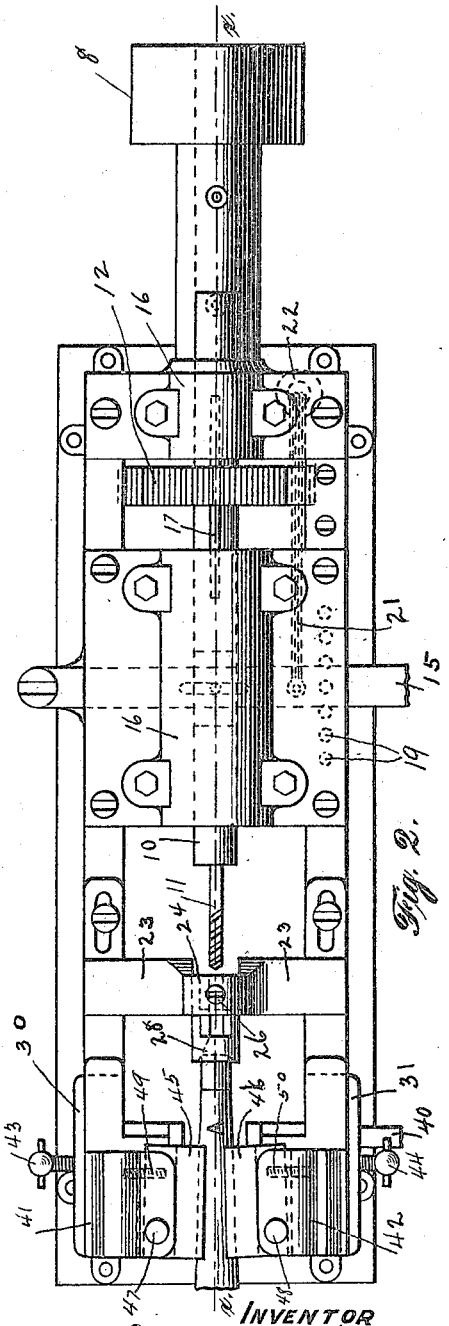

Figure 1 is a side elevational view of a boring or drilling machine embodying main features of my invention. Fig. 2 is a top or plan view thereof. Fig. 3 is a longitudinal sectional view taken on the line $x$—$x$ of Fig. 2. Fig. 4 is an elevational view of the left hand end of the machine. Fig. 5 is a cross sectional view on line $y$—$y$ of Fig. 4 looking from below and Figs. 6 and 7 are enlarged detail views illustrating the guide piece for the drill and socket for the work.

The present invention has especial relation to a machine for drilling or boring holes in irregularly shaped articles of a fragile or semifragile nature, such for instance as umbrella or cane handles or ferrules, pipe stems and the like. Such articles have usually an irregular periphery and are more or less conical in shape. In drilling or boring holes or openings in such articles the main difficulty heretofore has been in properly centering the article and in holding the article rigidly after being centered and while the drill is being advanced in the work.

In carrying out my invention I make use of a vise like clamp or holder comprising essentially two jaw pieces each pivoted at one end or corner so as to swing in a horizontal plane to bring their gripping faces into either parallel relationship or angular relationship as the work requires. And these two jaw pieces are so constructed and arranged that they may be adjusted transversely of the machine toward and away from each other and also longitudinally relative to the work socket. There is thus provided a clamp which has at least three separate means for adjustment for the work and hence will securely clasp and hold such work no matter what its contour may be. In the machine of my invention I also provide a mechanism for operating the jaws of the clamp so that they may first be brought together against the work to firmly grip the periphery of said work and thereafter advanced with the work to firmly force the work into the guide piece for the drill.

Referring now to the drawings; 8 represents the power pulley and 9 the shaft operated thereby. The drill shaft 10 carrying drill 11 is operated from shaft 9 through gears 12 and 13. A sleeve 14 operated through lever arm 15 serves to move the shaft 10 and drill 11 longitudinally in the bearings 16 and 16' and through the gear 12 there being a feathered connection 17 between shaft 10 and said gear. A stop pin 18 entering one of a series of holes 19 in the bed plate 20 of the machine serves to limit the movement of the lever arm 15 from right to left and thus controls the advance movement of drill 11 into the work A. A cord 21 and weight 22 serves to normally retract the lever arm 15 to thereby automatically withdraw the drill 11 from the work.

As heretofore described the parts of the machine differ in no essential respect from similar parts of drilling machines for wood or metal well known in the art and further details of the operation and construction of these parts are therefore not deemed necessary.

Upon the bed plate 20 to the left of the bearings for the drill shaft 10 is mounted a bracket 23 forming at its top 24 a bearing for a sleeve 25 the construction of which is illustrated in detail at Figs. 6 and 7. The sleeve 25 is essentially cylindrical in shape provided with a bushing 25' and is removably secured at one end in the bearing 24 by the set screw 26. Midway of its ends the periphery is provided with radial openings 27 through which the chips or saw dust on the drill 11 while engaging the work are permitted to escape. At its forward free end the sleeve 25 is bored conically as at 28 to receive and retain the end of the work A to be drilled, as clearly shown in Fig. 3. The sleeve 25 thus performs three functions; namely,—it serves as a guide or support for the drill as it enters and penetrates the work; it serves also as a guide, support and lock for the end of the work to be drilled, and it also serves as a means whereby the chips, etc., removed from the work by the drill, may fall from the machine. The clutch for the work A is located upon the bed plate 21 of the machine at the extreme left of the machine. It consists essentially of the following parts operating as hereinafter described. In the bed of the machine or preferably upon a plate 29 mounted thereon are dovetailed the two slides 30 and 31 arranged to be advanced toward or separated from each other transversely of the machine by the mechanism illustrated in detail in Figs. 4 and 5 of the drawings.

From slides 30 and 31, at their inner ends, depend pins 33 and 32 which enter cam slots 35 and 34 in a disk 36. The disk 36 is pivotally supported by the screw pivot 37 and secured in a stationary portion of the machine. To the disk 36 is secured a pinion 38 operated by a sector 39 carried by the lever 40. When the lever 40 is turned from left to right (Fig. 5) the pinion 38 and disk 36 turn in opposite directions and the disk 36 through its cam grooves or slots 34 and 35 draws the pins 32 and 33 toward each other to thereby advance the slides 30 and 31 toward each other to close the clutch. A reverse movement of lever 40 serves through the sector 39 pinion 38 and disk 36 to separate the pins and thereby retract the slides 30 and 31. Upon each slide 30 and 31 is mounted a bracket 41 and 42 respectively adapted to move on said slides longitudinally of the machine toward or away from the sleeve 25. Brackets 41 and 42 are locked in their adjusted positions by means of thumb screws 43 and 44. Each bracket 41 or 42 carries a clamping jaw 45 or 46 of the clamp and each clamping jaw 45 or 46 is pivoted at one end (farthest from the sleeve 25) in the bracket 41 or 42 by means of the pin 47 or 48. A spring 49 or 50 serves to throw the free end of each jaw inward so that the jaws 45 and 46 converge at their free ends. Each jaw carries in its interior a removable block 51 the projecting face of which is preferably angular as at 52. Where the character of the work demands it, the blocks 51 are made of soft material such as india rubber although if the work be unfinished and rough the blocks may be of wood or metal as desired.

In the operation of the machine, the slides 30 and 31 are retracted to their fullest extent by the lever 40. The work A is then passed through the clamping jaws 45 and 46 until its end rests in the conical end 28 of sleeve 25. The slides 30 and 31 are then brought together by lever 40, and the jaws 45 and 46 first engage upon their work at their forward spring controlled ends. As the slides 30 and 31 continue to advance the blocks 51 clamp down upon the periphery of the work and hold the work in the conical end of the sleeve 25 and lock it firmly therein. The work is then drilled, or milled as required and a reverse movement of lever 40 serves to release the work.

Having thus described the nature and object of my invention what I claim as new and desire to secure by Letters Patent, is,—

1. In a machine of the character described a clamp for the work, comprising two jaws supported independently of each other and each being pivotally supported at one end, and a spring for forcing the free end of each jaw toward the other jaw, in combination with means for moving the jaws transversely in the machine toward or away from each other and means whereby the jaws may be adjusted longitudinally in the machine.

2. In a machine of the character described, a clamp for the work, comprising two slides and means for moving the same transversely in the machine toward or away from each other, and two jaws each carried by one of said slides respectively, in combination with means whereby the jaws may be adjusted longitudinally in the machine on said slides independently of the means for transversely moving said slides.

3. In a machine of the character described, a clamp for the work comprising two slides having depending pins, a disk having cam slots engaging said pins, a lever and intermediate mechanism for operating said disk to thereby move said slides transversely in the machine toward or away from each other in combination with two jaws each carried by one of said slides respectively.

4. In a machine of the character described, a clamp for the work comprising two slides having depending pins, a disk having cam slots engaging said pins, a lever and intermediate mechanism for operating said disk to thereby move said slides transversely in the machine toward or away from each other in combination with two jaws each carried by one of said slides respectively and means whereby each jaw may be adjusted longitudinally in the machine independently of the transverse movement of said slides.

5. In a machine of the character described, a clamping mechanism consisting of two brackets, a jaw pivoted at one end in each of said brackets, a spring for the free end of each jaw arranged to force the free ends of the respective jaws toward each other, and a block of soft material carried by the inner face of each jaw.

In testimony whereof I affix my signature in presence of two witnesses.

JOHN M. DELLINGER.

Witnesses:
Wm. J. Mingle,
Chas. E. Long.

Copies of this patent may be obtained for five cents each, by addressing the "Commissioner of Patents, Washington, D. C."